(12) United States Patent
Chun et al.

(10) Patent No.: US 7,769,119 B2
(45) Date of Patent: Aug. 3, 2010

(54) METHOD OF INITIAL SYNCHRONIZATION OF A COMMUNICATION SIGNAL

(75) Inventors: Joon-Hwa Chun, Ossining, NY (US); Daniel Iancu, Pleasantville, NY (US)

(73) Assignee: Sandbridge Technologies, Inc., White Plains, NY (US)

( * ) Notice: Subject to any disclaimer, the term of this patent is extended or adjusted under 35 U.S.C. 154(b) by 870 days.

(21) Appl. No.: 11/527,536

(22) Filed: Sep. 27, 2006

(65) Prior Publication Data

US 2008/0075212 A1 Mar. 27, 2008

(51) Int. Cl.
*H04L 7/00* (2006.01)
*H04L 27/00* (2006.01)
*H03K 9/00* (2006.01)
*H04J 11/00* (2006.01)

(52) U.S. Cl. .................. 375/354; 375/316; 375/295; 370/208

(58) Field of Classification Search ............. 375/316, 375/295, 354
See application file for complete search history.

(56) References Cited

U.S. PATENT DOCUMENTS

| | | | | |
|---|---|---|---|---|
| 6,618,452 | B1* | 9/2003 | Huber et al. ............... | 375/343 |
| 6,690,680 | B1* | 2/2004 | Marchok et al. ........... | 370/480 |
| 6,937,586 | B2* | 8/2005 | Asokan .................... | 370/337 |
| 2002/0021684 | A1* | 2/2002 | Toshimitsu et al. ........ | 370/337 |
| 2004/0081131 | A1* | 4/2004 | Walton et al. ............. | 370/344 |
| 2004/0082356 | A1* | 4/2004 | Walton et al. ............. | 455/522 |
| 2004/0114551 | A1* | 6/2004 | Gavillero Martin et al. | 370/324 |
| 2004/0120410 | A1* | 6/2004 | Priotti ..................... | 375/260 |
| 2005/0120097 | A1* | 6/2005 | Walton et al. ............. | 709/220 |
| 2005/0226418 | A1* | 10/2005 | Lee et al. .................. | 380/233 |
| 2005/0229230 | A1* | 10/2005 | Santoru et al. ............ | 725/126 |
| 2007/0280098 | A1* | 12/2007 | Bhatt et al. ............... | 370/208 |

FOREIGN PATENT DOCUMENTS

EP  1 389 835 A1  2/2004

OTHER PUBLICATIONS

Kim et al., "Synchronization and Cell-Search Technique Using Preamble for OFDM Cellular Systems", IEEE Transactions on Vehicular Technology, vol. 56, No. 6, Nov. 2007, pp. 3469-3485.

(Continued)

*Primary Examiner*—Mohammad H Ghayour
*Assistant Examiner*—Sarah Hassan
(74) *Attorney, Agent, or Firm*—Barnes & Thornburg LLP

(57) ABSTRACT

The present method of initial synchronization of a communication signal includes the steps of symbol boundary search, fractional frequency offset estimation, fractional frequency offset compensation, frame boundary search, integer frequency offset estimation, integer frequency offset compensation, preamble segment ID search and preamble cell ID search. The symbol boundary search includes estimating the boundary of a present data symbol by a correlation index for the present data symbol and the correlation index for the next data symbol. The frame boundary search includes identifying the preamble symbol in the symbols found in the symbol boundary search to determine the frame boundary. The integer frequency offset estimation is derived from the pilot subcarriers of the frame control header of the frame after locating the preamble symbol.

14 Claims, 2 Drawing Sheets

OTHER PUBLICATIONS

Lim et al., "Initial Synchronization for WiBro", Asia-Pacific Conference on Communication, Oct. 2005, pp. 284-288.

Park et al., "Design of Synchronization in OFDMA/TDD Based WIBRO System", The 18th Annual IEEE International symposium on Personal, Indoor and Mobile Radio Communication, 2007.

Kim et al., "New Preamble Structures for Synchronization and Cell Searching in OFDM Systems", IEEE, 2005, pp. 1623-1627.

Schmidl et al., "Robust Frequency and Timing Synchronization for OFDM Systems", IEEE Transactions on Communication, vol. 45, No. 12, Dec. 1997, pp. 1613-1621.

* cited by examiner

METHOD OF INITIAL SYNCHRONIZATION OF A COMMUNICATION SIGNAL

BACKGROUND AND SUMMARY OF THE INVENTION

The present invention relates generally to the initial synchronization methods and more specifically to an improvement in the steps of the initial synchronization methods.

Although the method will be described for mobile WiMAX systems (IEEE 802.16e, WiBro) as an example, it is applicable to other communication systems and protocols. The initial synchronization methods generally include a frame boundary search, fractional/integer frequency offset estimation, and segment/cell ID searches.

The present method of initial synchronization of a communication signal includes the steps of symbol boundary search, fractional frequency offset estimation, fractional frequency offset compensation, frame boundary search, integer frequency offset estimation, integer frequency offset compensation, preamble segment ID search and preamble cell ID search.

The symbol boundary search includes estimating the boundary of a present data symbol by a correlation index for the present data symbol and the correlation index for the next data symbol. The combined correlation index is $$\hat{i} = \operatorname{argmax}_i \left| \sum_{v=0}^{G-1} \{ y_{i+v} y^*_{i+v+N_{FFT}} + y_{i+v+G+N_{FFT}} y^*_{i+v+G+2N_{FFT}} \} \right|$$

where i denotes the correlation index, G the cyclic prefix length, y the observed time domain samples, and $N_{FFT}$ the size of the symbol. The combined correlation index i is calculated iteratively as follows:

$$\hat{i} = \operatorname{argmax}_i |C(i)|,$$

where $C(0) = \sum_{v=0}^{G-1} \{ y_v y^*_{v+N_{FFT}} + y_{v+G+N_{FFT}} y^*_{v+G+2N_{FFT}} \}$ and $$C(i+1) = C(i) + (y_{i+G} y^*_{i+G+N_{FFT}}) + (y_{i+2G+N_{FFT}} y^*_{i+2G+2N_{FFT}}) - (y_i y^*_{i+N_{FFT}}) - (y_{i+G+N_{FFT}} y^*_{i+G+2N_{FFT}})$$

The frame boundary search includes identifying the preamble symbol in the symbols found in the symbol boundary search to determine the frame boundary. Identifying the preamble symbol includes grouping the subcarriers into K subgroups of N consecutive subcarriers, where K is the number of subcarriers that define a specific segment group of subcarriers; collecting the distributed energies on subcarriers; and making a decision if the current symbol is preamble based on a threshold that is estimated by stochastic count process model.

The integer frequency offset is estimated from the pilot subcarriers of the frame control header of the frame without decoding the down load MAP.

The preamble segment ID search is based on:

$$\hat{n} = \operatorname{argmax}_{n \in \{0,1,2\}} \left\{ \sum_{k=0}^{K-1} |y_{FFT}(PreambleCarrierSet_n^k)| \right\}$$

where $PremableCarrierSet_n^k = n + N \cdot k$, the group index of N groups n=0, 1, 2 . . . N−1, and the subcarrier index of a K length PN sequence k={0, 1, 2 . . . K−1}.

The preamble cell ID search includes estimating the symbol timing offset $\hat{\epsilon}_{|n}^r$ by:

$$\hat{\epsilon}_{|n}^r = \operatorname{arg}\left\{ \frac{N_{FFT}}{2\pi |m_{k+1} - m_k|} \left[ \sum_{m_k, m_{k-1} \in \{non\text{-}zero\ subcarrier\}} (y_{FFT}(m_{k+1}) \times \operatorname{sign}(pilot_{m_{k+1}}^{r,n})) \times (y'_{FFT}(m_k) \times \operatorname{sign}(pilot_{m_{k1}}^{r,n}))^* \right] \right\}$$

where the group index of N groups n=0, 1, 2 . . . N−1, cell ID of R cell IDs in a segment group r∈{0, 1, . . . , R−1}, $m_k$ and $m_{k+1}$ are two neighboring subcarrier positions, the subcarrier index of a K length PN sequence k={0, 1, 2 . . . K−1} and $pilot_m^{r,n}$ represents the modulated PN sample for the preamble.

The preamble cell ID is estimated by:

$$\hat{r} = \operatorname{argmax}_r \left\{ \left| \sum_{m \in \{non\text{-}zero\ subcarrier\}} \operatorname{real}(z_m^r) \times \operatorname{sign}(pilot_m^{\hat{n},r}) \right|^2 \right\}$$

where $$z_m^r = y'_{FFT}(m) \times \exp\left(j2\pi \frac{m}{N_{FFT}} \hat{\epsilon}_{|n}^r \right),$$

m∈{non-zero subcarriers}, $N_{FTT}$ is the symbol size.

These and other aspects of the present invention will become apparent from the following detailed description of the invention, when considered in conjunction with accompanying drawings.

DETAILED DESCRIPTION OF THE PREFERRED EMBODIMENTS

Figure 1:
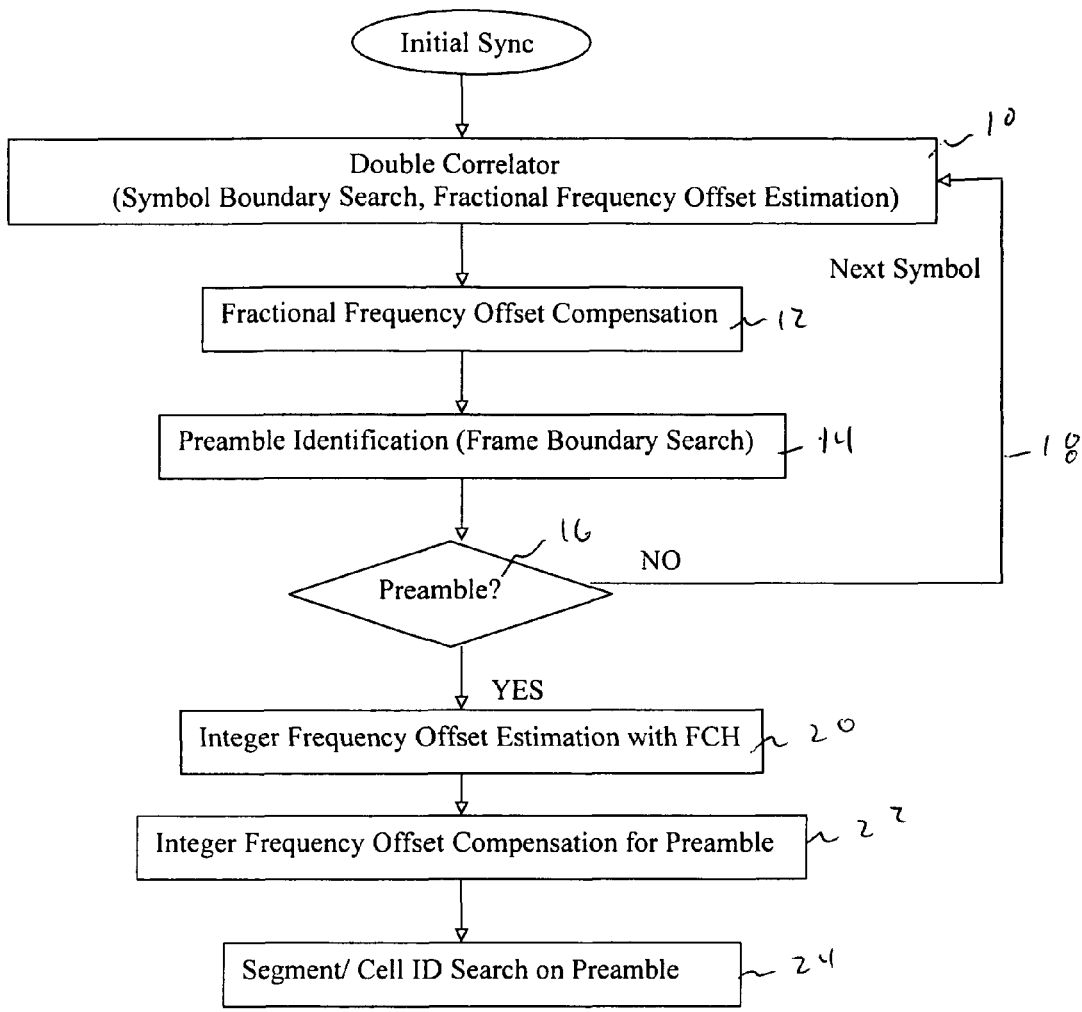
FIG. 1 is a flow chart of method of initial synchronization of a communication signal according to the present disclosure.

The method of initial synchronization of a communication signal is illustrated in FIG. 1. The initial synchronization process begins at Step 10 to perform the symbol boundary search and fractional frequency offset estimation using a double correlation. Next the fractional frequency offset is compensated at Step 12. The frame boundary search is performed by preamble identification at Step 14. If a preamble has not been found at Step 16, the process goes back to the Step 10 via 18 to again do a double correlation.

If a preamble has been found at Step 16, the integer frequency offset is estimated using the frame control head or FCH at Step 20. Next the integer frequency offset compensation for the preamble is performed at Step 22. Finally, a segment/cell ID search is performed on the preamble at Step 24. This is the end of the synchronization process.

Figure 2:
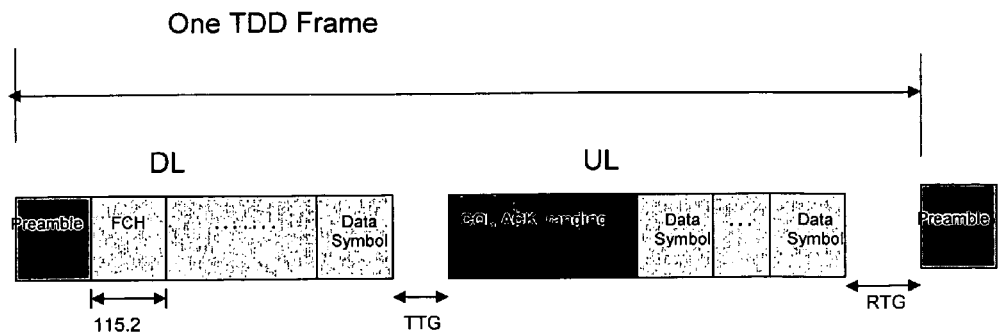
FIG. 2 is a diagram of an example of a TDD frame of the prior art.

Each frame in the downlink transmission begins with a preamble followed by down load DL and up load UL transmission periods as shown in FIG. 2. In the frame, the TTG shall be inserted between the downlink and uplink, and RTG at the end of each frame to allow the BS to turn around. In IEEE 802.16e WMAN-OFDMA, the duration of one physical frame ranges from 2 ms to 20 ms, and the FFT sizes of an OFDMA symbol are defined as 128, 512, 1024, and 2048. See IEEE 802.16e-2005, Standard for local and metropolitan area networks Part 16: Air Interface for Fixed and Mobile Broadband Wireless Access Systems. While in WiBro, the duration of one physical and the FFT size of OFDMA symbol are fixed as 5 m and 1024, respectively. See Specifications for 2.3 GHz band Portable Internet Service (TTAS. KO-06.0082/R1).

Although the initial synchronization algorithms is described for the WiBro system as an example, all these algorithms can be applied to 802.16e WMAN-OFDMA as well.

The first symbol of DL burst in every frame is the preamble. In the preamble, there are N or in this example three different segment groups, and each group has different PN sequences. The indices of these groups can be defined as $$PremableCarrierSet_n^k = n + N \cdot k, \quad (1)$$

where the group index of N groups n=0, 1, 2 ... N−1, and the subcarrier index of a K length PN sequence k={0, 1, 2 ... K−1} which will be mapped through.

Figure 3:
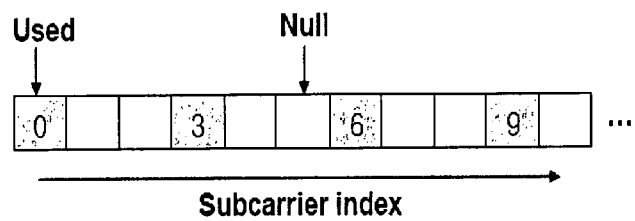
FIG. 3 is a diagram of an example of a subcarrier index of the prior art.

FIG. 3 shows the carrier indexing for the case of n=0. Data in every third position is separated by two null positions.

For example, in 1024 FFT mode, there are 114 different PN sequences (see Table 1), and out of them each 38 sequences are defined for a specific subcarrier group. Within a subcarrier group, each of the 38 sequences indicates a specific cell. There are 284 subcarriers defined for a specific segment group. The index variable n and k in equation (1) determines the segment of the cell and subcarrier index of the preamble subcarriers, respectively.

TABLE 1

PN sequence per segment & cell ID for 1024 FFT mode.

| Index | IDcell | Segment | Series to modulate (in hexadecimal format) |
|---|---|---|---|
| 0 | 0 | 0 | A6F294537B285E1844677D133E4D53CCB1F182DE00489E53E6B6E77065C7EE7D0ADBEAF |
| 1 | 1 | 0 | 668321CBBE7F462E6C2A07E8BBDA2C7F7946D5F69E35AC8ACF7D64AB4A33C467001F3B2 |
| 2 | 2 | 0 | 1C75D30B2DF72CEC9117A0BD8EAF8E0502461FC07456AC906ADE03E9B5AB5E1D3F98C6E |
| 3 | 3 | 0 | 5F9A2E5CA7CC69A5227104FB1CC2262809F3B10D0542B9BDFDA4A73A7046096DF0E8D3D |
| 4 | 4 | 0 | 82F8A0AB9181838D84BB86224F6C342D81BC8BFE791CA9EB54096159D672E91C6E13032F |
| 5 | 5 | 0 | EE27E59B84CCF15BB1565EF90D478CD2C49EE8A70DE368EED7C9420B0C6FFAF9AF035FC |
| 110 | 14 | 2 | 29E74579472FDD8FFC2700B2BF33C649989DD8153093A7CA08B50F7A5E4BAED108A0F0D |
| 111 | 15 | 0 | A27F29D8D6CCD7EB4BBE303C3E9E95802DB98BFD5B8ED03B88304359D92E3EC108CA3C8 |
| 112 | 16 | 1 | 3FE70E26FA00327FE3B2BE6BC5D5014F588F09C17D222C146DD68B4824692A651888C76 |
| 113 | 17 | 2 | 41E91307EC58801CFF2C7E9CFEFBEB71681FAE2BEAEC72D4E4556E99345D3BA4B369B59 |

The PN sequence to be assigned onto the preamble carrier set is modulated as $$Pilot_k = 4 \cdot \sqrt{2} \cdot \left(\frac{1}{2} - w_k\right), k = 0, 1, \ldots, K-1, \quad (2)$$

where $w_k$ denotes the PN sequence in Table 1. Finally, the modulated preamble sequence is assigned to preamble subcarriers according to the index defined in equation (1).

In addition to modulated preamble subcarriers, for 1024 FFT mode, there will be 86 guard band subcarriers on the left and right.

The frame boundary search consists of two steps; the symbol boundary search and preamble identification. Once stream of filtered samples are available, the symbol boundary search block compute correlations between one sample to other sample with distance of symbol size. This correlation utilizes the repeating characteristic of the guard period (CP: Cyclic Prefix). Let $N_{FFT}$ and G be the OFDMA symbol size and the CP size. The correlation window size is set to $N_{FFT}+G$ and within the window, a position of the correlated samples which provides the maximum correlator outputs is regarded as the symbol boundary. As discussed below, the frame boundary search scheme based on the symbol boundary search result.

Figure 4:
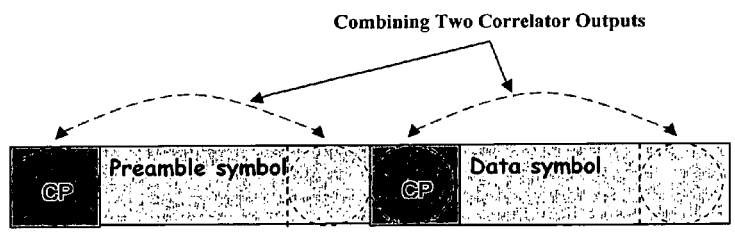
FIG. 4 is a diagram of a double correlation of the estimate the symbol boundary according to the present disclosure.

The symbol boundary search relies on the characteristic of the guard period repetition in OFDM symbol. In this case, the ML estimate of the Symbol boundary is well known and is given by:

$$\hat{i} = \operatorname*{argmax}_{i} \left| \sum_{v=0}^{G-1} y_{i+v} y^*_{i+v+N_{FFT}} \right|, \quad (3)$$

where i, G, y, and $N_{FFT}$ denote the correlation index, the cyclic prefix length, the observed time domain samples, and the number of the OFDM symbol subcarriers, respectively. The correlation of the repeating pattern of guard period for the next data symbol and add this additional correlation result to equation (3). This is the double correlator shown in FIGS. 1 and 4.

The estimation based on the double correlator can be shown as $$\hat{i} = \operatorname*{argmax}_{i} \left| \sum_{v=0}^{G-1} \left\{ y_{i+v} y^*_{i+v+N_{FFT}} + y_{i+v+G+N_{FFT}} y^*_{i+v,G+2N_{FFT}} \right\} \right|. \quad (4)$$

Simply speaking, it is doubling the amount of statistics to provide better ML estimation results. The correlation in equation (4) can be calculated in iterative manner like below:

$$i = \operatorname*{argmax}_{i} |C(i)|, \quad (5)$$

where $C(0) = \sum_{v=0}^{G-1} \left\{ y_v y^*_{v+N_{FFT}} + y_{v+G+N_{FFT}} y^*_{v+G+2N_{FFT}} \right\}$ and $C(i+1) = C(i) + (y_{i+G} y^*_{i+G+N_{FFT}}) +$
$(y_{i+2G+N_{FFT}} y^*_{i+2G+2N_{FFT}}) - (y_i y^*_{i+N_{FFT}}) - (y_{i+G+N_{FFT}} y^*_{i+G+2N_{FFT}}).$ The number of computations in equation (4) does not require twice the number of computations than in equation (3). To explain the computational complexity for equation (4), let $S_t^n$ be the correlator outputs through sample n and $n+N_{FFT}$ within a correlation window t, where n=0, 1, ..., $N_{FFT}$+G−1 and t=0, 1, 2, 3, ..... Also, let $S_t=\{S_t^n\}_{n=0}^{N_{FFT}+G-1}$. When the correlations, $S_t$, 0<t, are calculated for a group of samples covered in t-th correlation window, the double correlation in equation (4) can be computed by adding the previous correlation outputs, $S_{t-1}$ to the current correlation outputs for $S_t$. Thus, the computations in equation (4) only require extra $N_{FFT}$+G additions of the computations in equation (3).

That is, the terms $(y_{i+G} y^*_{i+G+N_{FFT}})$, $(y_i y^*_{i+N_{FFT}})$, and $(y_{i+v} y^*_{i+v+N_{FFT}})$ in equation (5) are already computed at previous correlator at window t−1 and can be added to the current correlator output to make double correlation.

The difference in the slot boundary estimation performance between the method in equation (3) and equation (4) is significant. Following Table 2 shows the variances for the double and single correlator for the case of SNRs; 3 dB, 6 dB, and 9 dB. The number of trials were 10,000 per each SNR case.

TABLE 2

|  | 3 dB | 6 dB | 9 dB |
|---|---|---|---|
| Variance of the Symbol boundary estimator (Single Correlator) | 1.30 | 0.86 | 0.71 |
| Variance of the Symbol boundary estimator (Double Correlator) | 0.60 | 0.40 | 0.32 |

The results clearly show that the variances of the symbol boundary estimator from double correlator are about two times smaller than one from single correlator.

In the following table 3, another measurement is presented in which the performances of double and single correlator can be compared. The metric is defined as $$\text{Rate\_Miss} = \frac{\text{Number of the cases that the symbol boundary is falsely detected}}{\text{Total Number of Trials}}$$

In Table 3, this metric is computed 10,000 times for SNR of 3 dB, 6 dB, and 9 dB.

TABLE 3

|  | 3 dB | 6 dB | 9 dB |
|---|---|---|---|
| Rate_Miss (Single Correlator) | 0.42 | 0.36 | 0.33 |
| Rate_Miss (Double Correlator) | 0.28 | 0.22 | 0.19 |

Once the symbol boundary is estimated, the frame boundary has to be determined. In the system, since the first symbol in the frame is the preamble, searching for the frame boundary is the same as identifying the preamble symbol out of the symbols whose boundary has been found.

Without loss of generality, the search procedure based on the WiBro system (1024 FFT mode) will be explained. In the WiBro system, after disregarding guard bands, a preamble is composed of 852 subcarriers (284 non-zero subcarriers+568 zero subcarriers). There are 284 subcarriers defined for a specific segment group, j,j=0, 1, 2. Let us define a subgroup which includes 3 consecutive subcarriers. There will be 284 subgroups and within each subgroup, the index j,j=0, 1, 2, represents corresponding segment ID. The approach for identifying preamble is based on a count process, in which the energies per each subcarrier are computed and the computed energies of three consecutive subcarriers are grouped as three vectors, say $(e_0^k, e_1^k, e_2^k)$, k=0, ..., 283, as discussed above. Within each group, a subcarrier position, j,j=0, 1, 2, corresponds to the maximum energy in the group are searched and counted.

For clarification purpose, this procedure is explained in the following example. Suppose the sequence of subcarrier energies for the FFTed and guard band removed preamble symbol is (1.0, 3.6, 0.9, 1.2, 3.3, 0.7, ..., 2.1, 1.3, 0.7, 1.1, 3.3, 0.7). First, the sequence of subcarrier energies are grouped as three vectors in consecutive manner and let $\hat{j}^k$ denote the position of subcarrier which provide maximum energy in group k. The following is the count process At k=0: $(e_0^0, e_1^0, e_2^0) = (1.0, 3.6, 0.9), \therefore \hat{j}^0 = 2,$ At k=1: $(e_0^1, e_1^1, e_2^1) = (1.2, 3.3, 0.7), \therefore \hat{j}^1 = 2,$ At $k=100$: $(e_0^{100}, e_1^{100}, e_2^{100}) = (2.1, 1.3, 0.7), \therefore \hat{j}^{100} = 1,$ At $k=283$: $(e_0^{283}, e_1^{283}, e_2^{283}) = (1.1, 3.3, 0.7), \therefore \hat{j}^{283} = 2,$ After counting $\hat{j}^k$, a dominant $j, j=0, 1, 2$, in the groups is determined from the number of its occurrences. The number of occurrences for $\hat{j}^k \in \{0, 1, 2\}$ can be interpreted as the weight of its significance, and the normalized version of these weights can be used as the probabilities of $j, j=0, 1, 2$, being a dominating subcarrier position. These probabilities can be well modeled by a conjugate prior distribution to multinomial distribution, Dirichlet distribution described in J. M. Bernardo and A. F. M. Smith, "Bayesian Theory", *Wiley* 1994.

A continuous random vector $x=(x_1, x_2, \ldots, x_k)$ has a Dirichlet distribution of dimension k, with parameters $\alpha=(a_1, a_2, \ldots, a_{k+1})$ ($\alpha_i>0, i=1, \ldots, k=1$) if its probability density $D_k(x|\alpha)$, $0<x_i<1$ and $x_1+x_2+\ldots+x_k<1$, is $$D_k(x|\alpha) = c x_1^{\alpha_1-1} x_2^{\alpha_2-1} \ldots x_k^{\alpha_k-1} \left(1 - \sum_{i=1}^{k} x_i\right)^{\alpha_{k+1}-1}$$

where c is the normalization constant and is defined by $$c = \frac{\Gamma\left(\sum_{i=1}^{k+1} \alpha_i\right)}{\prod_{i=1}^{k+1} \Gamma(\alpha_j)}.$$

The mean vector are given by $$E[x_i] = \frac{\alpha_i}{\sum_{j=1}^{k+1} \alpha_j}.$$

Let $P_j$, $j=0, 1, 2$, be the probability of $j, j=0, 1, 2$, being dominant in groups, and let $N_j$, $j=0, 1, 2$, be the counted numbers which says how many times j being dominant in 284 groups. Then, the Dirchlet distribution of $P_j$, $j=0, 1, 2$, can be expressed by $$D_2[P_j|\alpha] \propto P_0^{N_{01}-1} P_1^{N_1-1} \left(1 - \sum_{i=0}^{i} P_i\right)^{N_2-1} \quad (6)$$

The mean of the distribution is used for the probability estimation. That is, $$\hat{P}_j = E[P_j] = \frac{N_j}{\sum_{i=0}^{2} N_i} = \frac{N_j}{284}.$$

The estimated probability $\hat{P}_j$, $j=0, 1, 2$, is used as the threshold for determining the preamble. Following Table 4 shows the estimated probability of $j, j=0, 1, 2$, for SNR of 0 dB, 3 dB, and 6 dB when the true segment ID is 1. The number of trials were 10,000 for each SNR case.

TABLE 4

|  | 0 dB | 3 dB | 6 dB |
|---|---|---|---|
| $\hat{P}_0$ | 0.02 | 0.0018 | 0.0 |
| $\hat{P}_1$ | 0.96 | 0.9916 | 1.0 |
| $\hat{P}_2$ | 0.02 | 0.0018 | 0.0 |

The results in the table above shows us that even in hostile environment (SNR=0 dB case), the estimated probability of dominating subcarrier position is as clear as 0.96.

The probability can be used as the threshold for preamble decision. For example, the probability 0.96 can be interpreted as like one subcarrier position occurred in about 272 times in SNR 0 dB. Thus, in SNR 0 dB environment, if the number of occurrences of a subcarrier position is over 272 times, the current symbol is the preamble.

The frequency offset is estimated after symbol synchronization. In the offset, there are integer parts and fractional parts, and both have to be estimated. Let $\epsilon$, $\epsilon_f$, and $\epsilon_I$ denote frequency offset, integer frequency offset, and fractional frequency offset, respectively.

The relationship among frequency offset, the integer frequency offset, and fractional frequency offset can be given as $$\epsilon = (\epsilon_I \times \text{subcarrier spacing} + \epsilon_f) \text{Hz}. \quad (7)$$

ML estimation of the fractional frequency offset based on correlator outputs have been well known [2]. The fractional frequency offset $\epsilon_f$ can be estimated from $$\hat{\epsilon}_f = \frac{\arg\{C(\hat{i})\}}{2\pi \times D \times T_s}, \quad (8)$$

where $C(\hat{i})$ is the maximum correlation calculated in (5), D denotes the delay, and $T_s$ the sample time.

The pilot subcarriers in FCH (Frame Control Header) is used to estimate the integer frequency offset. Since the sub-channelization scheme used for FCH is always PUSC, we do not need to decode DL MAP to check the subchannelization mode of FCH. Thus, upon reception of the symbol following the preamble, the exact location of pilot subcarriers is after taking FFT of the symbol. In the WiBro system, the power of each pilot tone should be boosted 2.5 dB higher than the average power level of data tones. With this constraint, the integer frequency offset which can cause cyclic shift of subcarrier position in a symbol is estimated.

The segment ID and cell ID search are performed after preamble identification. The post-FFT processing for both segment ID and the cell ID search are used. As shown in FIG. 1, once the integer frequency offset is compensated for an identified preamble symbol, segment ID search is performed on the FFTed preamble symbol. After the segment ID is estimated, the number of cell ID candidates can be reduced by factor 3. That is, cell ID search can be performed within a decided segment group.

Let $y_{FFT}$ be the FFTed frequency samples of the preamble after removing guard subcarriers. The segment ID can be then searched based on the following criterion (See equation (1) for the description of index variables):

$$\hat{n} = \underset{n \in \{0,1,2\}}{\mathrm{argmax}} \left\{ \sum_{k=0}^{K-1} |y_{FFT}(PreambleCarrierSet_n^k)| \right\}.$$

After the segment ID is determined, the number of candidates for the true preamble sequence is reduced to one third of the number. With regard to each candidate sequence, the symbol timing offset is estimated from the possible frame boundary estimation error. Symbol timing offset can be estimated by averaging the phase differences among neighbor frequency samples:

$$\hat{\varepsilon}_{|n}^r = E\left\{ \frac{N_{FFT}}{2\pi|m_{k+1}-m_k|} \left[ \arg\left(\frac{y_{FFT}(m_{k+1})}{pilot_{m_{k+1}}^{r,n}}\right) - \arg\left(\frac{y_{FFT}(m_k)}{pilot_{m_k}^{r,n}}\right) \right] \right\}, \quad (9)$$

where $\hat{\varepsilon}_{|n}^r$ denotes the symbol timing error estimate based on assumption that the preamble is member of a segment group n, n=0, 1, 2, and cell ID, r∈{0, 1, ..., R−1}, R denotes the number of cell IDs in a segment group. The $m_k$ and $m_{k+1}$, k=0, 1, ..., K−1 (see equation (1) for the description of K), are two neighboring subcarrier positions, and $pilot_m^{r,n}$ represents the modulated PN sample for the preamble. See K. Nikitopoulos and A. Polydoros, "Post-FFT Fine Frame Synchronization for OFDM system" in *VTC* 1997.

The average operation in equation (9) can be replaced by simple summation. Also since the phase difference is only of interest, calculation can be further simplified as:

$$\hat{\varepsilon}_{|n}^r = \arg\left\{ \frac{N_{FFT}}{2\pi|m_{k+1}-m_k|} \left[ \sum_{m_k,m_{k=1} \in \{non-zero\ subcarrier\}} (y_{FFT}(m_{k+1}) \times \mathrm{sign}(pilot_{m_{k+1}}^{r,n})) \times (y'_{FFT}(m_k) \times \mathrm{sign}(pilot_{m_{k_1}}^{r,n}))^* \right] \right\} \quad (10)$$

For each r, the symbol timing error can be compensated (or corrected) by $$z_m^r = y'_{FFT}(m) \times \exp\left( j2\pi \frac{m}{N_{FFT}} \hat{\varepsilon}_{|n}^r \right), \quad (11)$$

where m∈ {non-zero subcarriers}, r={0, 1, ..., R−1}.

The cell ID is estimated by choosing the maximum output of the dot products (cross-correlating equation (7) and r modulated pilot patterns with lag zero). That is, $$\hat{r} = \underset{r}{\mathrm{argmax}} \left\{ \left| \sum_{m \in \{non-zero\ subcarriers\}} \mathrm{real}(z_m^r) \times \mathrm{sign}(pilot_m^{\hat{n},r}) \right|^2 \right\} \quad (12)$$

Although the present invention has been described and illustrated in detail, it is to be clearly understood that this is done by way of illustration and example only and is not to be taken by way of limitation. The scope of the present invention is to be limited only by the terms of the appended claims.

What is claimed is:

1. A method of initial synchronization of a communication signal including the steps of symbol boundary search, fractional frequency offset estimation, fractional frequency offset compensation, frame boundary search, integer frequency offset estimation, integer frequency offset compensation, preamble segment ID search and preamble cell ID search, wherein the symbol boundary search comprises:

estimating the boundary of a present data symbol by a correlation index for the present data symbol and a correlation index for the next data symbol, wherein the combined correlation index is $$\hat{i} = \underset{i}{\mathrm{argmax}} \left| \sum_{v=0}^{G-1} \{ y_{i+v} y_{i+v+N_{FFT}}^* + y_{i+v+G+N_{FFT}} y_{i+v+G+2N_{FFT}}^* \} \right|,$$

wherein the combined correlation index $\hat{i}$ is calculated iteratively as follows:

$$\hat{i} = \underset{i}{\mathrm{argmax}} |C(i)|, \text{ where}$$

$$C(0) = \sum_{v=0}^{G-1} \{ y_v y_{v+N_{FFT}}^* + y_{v+G+N_{FFT}} y_{v+G+2N_{FFT}}^* \} \text{ and}$$

$$C(i+1) = C(i) + (y_{i+G} y_{i+G+N_{FFT}}^*) + (y_{i+2G+N_{FFT}} y_{i+2G+2N_{FFT}}^*) - (y_i y_{i+N_{FFT}}^*) - (y_{i+G+N_{FFT}} y_{i+G+2N_{FFT}}^*)$$

and
where $\hat{i}$ denotes the correlation index, G the cyclic prefix length, y the observed time domain samples, and $N_{FFT}$ the size of the symbol.

2. The method of claim 1, wherein the frame boundary search includes identifying the preamble symbol in the symbols found in the symbol boundary search to determine the frame boundary.

3. The method of claim 2, wherein identifying the preamble symbol includes grouping the subcarriers into K subgroups of N consecutive subcarriers, where K is the number of subcarriers that define a specific segment group of subcarriers; collecting the distributed energies on subcarriers; and making a decision if the current symbol is preamble based on a threshold that is estimated by stochastic approximation.

4. The method of claim 1, wherein the integer frequency offset estimation is derived from the pilot subcarriers of the frame control header of the frame after locating the preamble symbol.

5. The method of claim 1, wherein the integer frequency offset estimation is derived from the pilot subcarriers of the frame control header of the frame without decoding the down load MAP.

6. The method of claim 1, wherein the preamble segment ID search and the preamble cell ID search are performed after the integer frequency offset compensation of the identified preamble.

7. The method of claim 6, wherein the preamble segment ID search is performed before the preamble cell ID search.

8. The method of claim 1, wherein the preamble segment ID search is based on:

$$\hat{n} = \underset{n \in \{0,1,2\}}{\mathrm{argmax}} \left\{ \sum_{k=0}^{K-1} |y_{FFT}(PreambleCarrierSet_n^k)| \right\}$$

where $PreambleCarrierSet_n^k = n + N \cdot k$, the group index of N groups n=0, 1, 2 ... N−1, and the subcarrier index of a K length PN sequence k={0, 1, 2 ... K−1}.

9. The method of claim 1, wherein the preamble cell ID search includes estimating the symbol timing offset $\hat{\epsilon}_{|n}^r$ by:

$$\hat{\epsilon}_{|n}^r = \arg\left\{ \frac{N_{FFT}}{2\pi|m_{k+1} - m_k|} \left[ \sum_{m_k, m_{k=1} \in \{non-zero\ subcarrier\}} (y_{FFT}(m_{k+1}) \times \mathrm{sign}(pilot_{m_{k+1}}^{r,n})) \times (y'_{FFT}(m_k) \times \mathrm{sign}(pilot_{m_{k1}}^{r,n}))^* \right] \right\}$$

where the group index of N groups n=0, 1, 2 ... N−1, cell ID of R cell IDs in a segment group r∈{0, 1, ..., R−1}, $m_k$ and $m_{k+1}$ are two neighboring subcarrier positions, the subcarrier index of a K length PN sequence k={0, 1, 2 ... K−1} and $pilot_m^{r,n}$ represents the modulated PN sample for the preamble.

10. The method of claim 9, wherein the preamble cell ID is estimated by:

$$\hat{r} = \underset{r}{\mathrm{argmax}} \left\{ \left| \sum_{m \in \{non-zero\ subcarriers\}} \mathrm{real}(z_m^r) \times \mathrm{sign}(pilot_m^{\hat{n},r}) \right|^2 \right\}$$

where $$z_m^r = y'_{FFT}(m) \times \exp\left(j 2\pi \frac{m}{N_{FFT}} \hat{\epsilon}_{|n}^r\right),$$

m∈{non-zero subcarriers}, $N_{FTT}$ is the symbol size.

11. A method of initial synchronization of a communication signal including the steps of symbol boundary search, fractional frequency offset estimation, fractional frequency offset compensation, frame boundary search, integer frequency offset estimation, integer frequency offset compensation, preamble segment ID search and preamble cell ID search, wherein the integer frequency offset estimation is derived from the pilot subcarriers of the frame control header of the frame after locating the preamble symbol, wherein the integer frequency offset estimation is derived from the pilot subcarriers of the frame control header of the frame without decoding the down load MAP.

12. The method of claim 11, wherein the frame boundary search includes identifying the preamble symbol in the symbols found in the symbol boundary search to determine the frame boundary, and identifying the preamble symbol comprises:

grouping the subcarriers into K subgroups of N consecutive subcarriers, where K is the number of subcarriers that define a specific segment group of subcarriers;
collecting the distributed energies on subcarriers; and
making a decision if the current symbol is preamble based on a threshold that is estimated by stochastic approximation.

13. The method of claim 12, wherein the preamble segment ID search is based on:

$$\hat{n} = \underset{n \in \{0,1,2\}}{\mathrm{argmax}} \left\{ \sum_{k=0}^{K-1} |y_{FFT}(PreambleCarrierSet_n^k)| \right\}$$

where $PreambleCarrierSet_n^k = n + N \cdot k$, the group index of N groups n=0, 1, 2 ... N−1, and the subcarrier index of a K length PN sequence k={0, 1, 2 ... K−1}.

14. A method of initial synchronization of a communication signal including the steps of symbol boundary search, fractional frequency offset estimation, fractional frequency offset compensation, frame boundary search, integer frequency offset estimation, integer frequency offset compensation, preamble segment ID search and preamble cell ID search, wherein the preamble cell ID search includes estimating the symbol timing offset $\hat{\epsilon}_{|n}^r$ by:

$$\hat{\epsilon}_{|n}^r = \arg\left\{ \frac{N_{FFT}}{2\pi|m_{k+1} - m_k|} \left[ \sum_{m_k, m_{k=1} \in \{non-zero\ subcarrier\}} (y_{FFT}(m_{k+1}) \times \mathrm{sign}(pilot_{m_{k+1}}^{r,n})) \times (y'_{FFT}(m_k) \times \mathrm{sign}(pilot_{m_{k1}}^{r,n}))^* \right] \right\}$$

where the group index of N groups n=0, 1, 2 ... N−1, cell ID of R cell IDs in a segment group r∈{0, 1, ..., R−1}, $m_k$ and $m_{k+1}$ are two neighboring subcarrier positions, the subcarrier index of a K length PN sequence k={0, 1, 2 ... K−1} and $pilot_m^{r,n}$ represents the modulated PN sample for the preamble,
wherein the preamble cell ID is estimated by:

$$\hat{r} = \underset{r}{\mathrm{argmax}} \left\{ \left| \sum_{m \in \{non-zero\ subcarriers\}} \mathrm{real}(z_m^r) \times \mathrm{sign}(pilot_m^{\hat{n},r}) \right|^2 \right\}$$

where $$z_m^r = y'_{FFT}(m) \times \exp\left(j 2\pi \frac{m}{N_{FFT}} \hat{\epsilon}_{|n}^r\right),$$

m∈{non-zero subcarriers}, $N_{FTT}$ is the symbol size.

\* \* \* \* \*